Patented Feb. 10, 1953

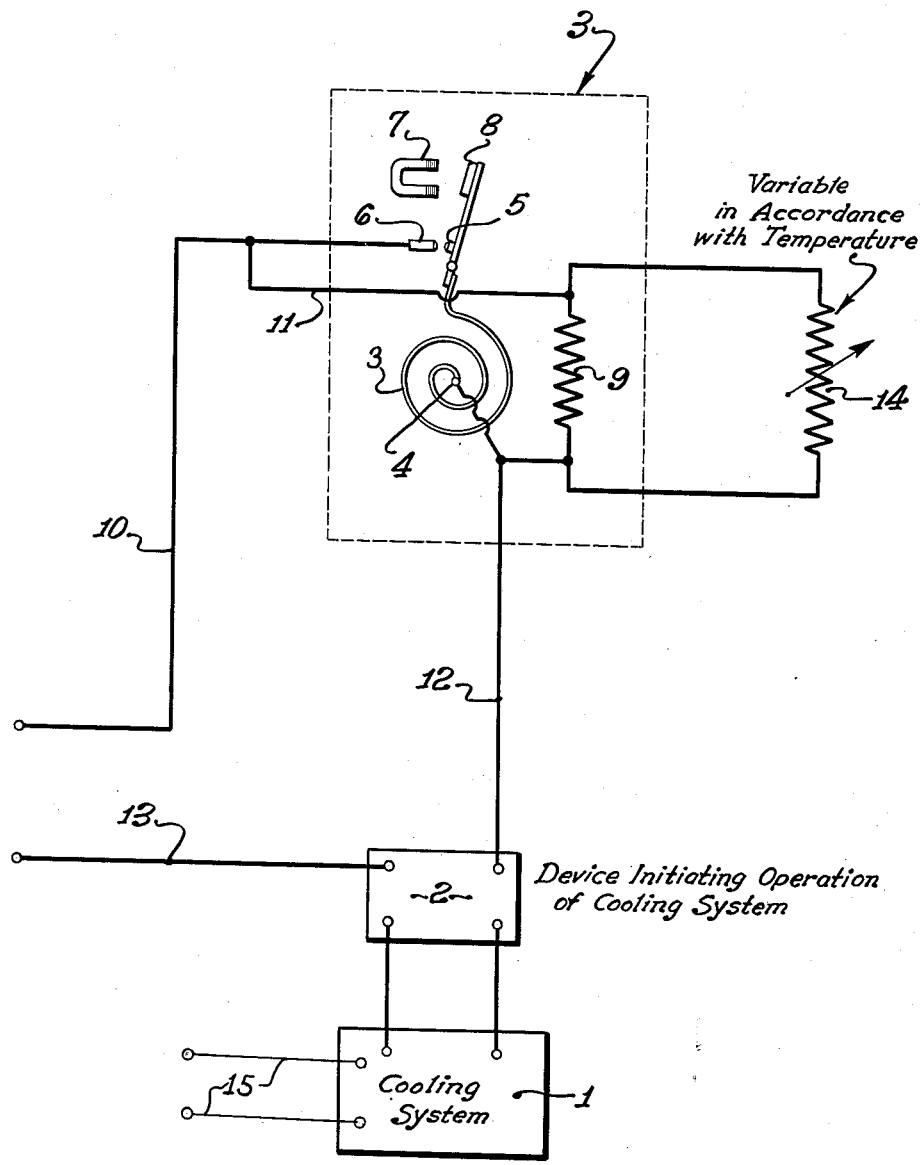

2,628,034

UNITED STATES PATENT OFFICE 2,628,034

TEMPERATURE RESPONSIVE APPARATUS FOR CONTROLLING COOLING SYSTEMS

William A. Ray, North Hollywood, Calif., assignor to General Controls Co., a corporation of California Application March 28, 1949, Serial No. 83,892

2 Claims. (Cl. 236—68)

This invention relates to thermostatic controls, and especially for cooling systems used for air conditioning or the like.

Cooling systems are often provided with automatic thermostatic controls to set the system into operation when the temperature attains a predetermined high value, and to return the system to inactive condition when the space temperature attains a predetermined low value.

The usual thermostats employed in such systems respond to the temperature of the circumambient atmosphere, and they are unaffected by the temperature trend. Accordingly, although the cooling system is started just as soon as the upper limit of temperature is reached, yet, before the system can be fully effective, the temperature may rise still further. This lag in the cooling may be further aggravated when outdoor temperatures are excessive.

It is one of the objects of this invention greatly to reduce the lag, and thereby to ensure against undesired temperature rise.

In order to accomplish this result, there is provided an anticipator which initiates the operation of the cooling system early enough to hold the temperature below the predetermined high value. Particularly, the anticipator is made responsive to outdoor temperature, to accelerate the time when the cooling system is placed into operation when the outdoor temperature increases.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings, the single figure is a diagrammatic representation of a system incorporating the invention.

An electrically operated cooling system 1 is controlled by a device 2, such as an electromagnet or the like. This device 2 initiates the operation of the cooling system 1 and may be a relay electrically operated by a thermostat 3. Leads 15 serve to connect the cooling system 1 with an appropriate source of energy.

The thermostat 3 is shown as a bimetal having a coiled portion anchored at its inner end on a binding post 4. Its outer extremity carries a movable contact 5 cooperating with a stationary contact 6.

The thermostat 3 is placed in the space to be cooled, such as in a home, theatre, auditorium, or the like. It is, accordingly, subjected to the temperature of the space to be cooled; and, when the temperature reaches a definite high value, the thermostat causes the contacts 5 and 6 to be engaged. When this occurs, the device 2 is energized in order to initiate the operation of the cooling system 1. When the temperature has been reduced to a desired value, the thermostat 3 opens the contacts 5 and 6, causing the cooling system to return to an inactive condition.

In order that the contacts 5 and 6 be opened with a snap action, a permanent magnet 7 may be provided, cooperating with an armature 8 mounted on the movable arm of thermostat 3. When the thermostat 3 operates to close the contacts 5 and 6, the armature 8 is moved to attracted position. When thereafter the thermostat is subjected to a sufficiently low temperature, the magnetic force is suddenly overcome and the contacts 5 and 6 are separated quickly.

Ordinarily, there is a lag between the instant that the cooling system is placed into operation and the time when its cooling effect becomes apparent in the space to be cooled. In order to overcome this lag, use is made of an electrical heating element 9 that is connected across the contacts 5 and 6. This electrical heating means 9 is arranged in close position to the thermostat 3 for heating the thermostat. When the contacts 5 and 6 are separated, or in the inactive position, a small heating current flows from the main 10 to connection 11, heater 9, to connection 12, device 2, back to main 13. The resistance of the heater 9 is quite high, so that, with the contacts 5 and 6 separated, there is not sufficient current flowing through the device 2 to cause operation of device 2. Only a small amount of heat is generated by the heating means 9. Nevertheless, this additional heat, when the thermostat contacts are separated, accelerates the time when the contacts 5 and 6 are placed in engagement. When thus placed in engagement, there is then sufficient current through the device 2 to cause initiation of operation of the cooling system. Since the resistance of heater 9 is high (comparable to that of device 2) the line voltage does not produce harmful effects on the heater.

The heating means 9 may be made variable, so that it will generate more heat if the outdoor temperature is high. For example, the outdoor temperature is caused to control the amount of heat generated by the anticipating means 9. This can be effected in any of several ways as by varying the resistance of the means 9, or by varying the current flow through the means 9. In the present instance, a variable resistor 14 is indicated, placed in parallel with the heater 9. This variable resistor is made to vary in accordance with outdoor temperature in any well known manner. When the temperature rises, the resistance of resistor 14 increases, causing more current to flow through the shunt path 9 which is in series with the device 2. As the outdoor temperature decreases, the resistor 14 decreases, and less current flows through the heating means 9.

The lag in the cooling of the space is materially reduced by the anticipating means hereinabove described. The thermostat 3 responds not only to the temperature of the space to be cooled, but also to the external temperature. The higher the external temperature, the greater is the rate at which the cooled space becomes heated, and, accordingly, the quicker should be the response of the thermostat 3. This is effected by causing the heating unit 9 to accelerate the time when the contacts 5 and 6 are engaged in accordance with the outdoor temperature.

The inventor claims:

1. In a thermostatic control for a cooling system having electrically operated means for initiating the operation of the system: a thermostat affected by the temperature of the space to be cooled; contacts controlled by the thermostat for operating said initiating means; electrical heating means for the thermostat wholly connected across the contacts; the combined resistance of the heating means and the initiating means being effective, unless the contacts be engaged, for maintaining said cooling system inactive; and means responsive to variations in outdoor temperature to increase the heat generated by the heating means as the outdoor temperature increases.

2. In a thermostat control for a cooling system having electrically operated means for initiating the operation of the system: a thermostat exposed to the temperature of the space to be cooled; contacts controlled by the thermostat for operating said initiating means upon a rise of temperature at the thermostat; an electrical heating means adjacent the thermostat and wholly connected across the contacts; and a resistance connected across the heating means to form a parallel circuit, said resistance being subjected to the outdoor temperature and increasing the heating effect on said thermostat as the outdoor temperature increases; said initiating means and the parallel circuit being in series relation, the combined resistance of the parallel circuit and the initiating means being effective, unless the contacts be engaged, for maintaining the cooling system inactive.

WILLIAM A. RAY.

REFERENCES CITED

The following references are of record in the file of this patent:

UNITED STATES PATENTS

| Number | Name | Date |
|---|---|---|
| 2,163,744 | Buchanan | June 27, 1939 |
| 2,183,874 | Shivers | Dec. 19, 1939 |
| 2,346,592 | Lehane et al. | Apr. 11, 1944 |
| 2,394,708 | Masek | Feb. 12, 1946 |
| 2,481,849 | Lehane | Sept. 13, 1949 |
| 2,485,003 | Lehane | Oct. 18, 1949 |
| 2,522,313 | Smith | Sept. 12, 1950 |